US008835350B2

(12) United States Patent
Peterson et al.

(10) Patent No.: US 8,835,350 B2
(45) Date of Patent: Sep. 16, 2014

(54) FLUID FILTRATION MEDIUM

(71) Applicants: Stephen L. Peterson, Peralta, NM (US); Ronald L. Coufal, Granbury, TX (US)

(72) Inventors: Stephen L. Peterson, Peralta, NM (US); Ronald L. Coufal, Granbury, TX (US)

(73) Assignee: Zeotech Corporation, Fort Worth, TX (US)

( * ) Notice: Subject to any disclaimer, the term of this patent is extended or adjusted under 35 U.S.C. 154(b) by 156 days.

(21) Appl. No.: 13/648,079

(22) Filed: Oct. 9, 2012

(65) Prior Publication Data

US 2013/0026103 A1 Jan. 31, 2013

Related U.S. Application Data

(62) Division of application No. 12/628,817, filed on Dec. 1, 2009, now Pat. No. 8,338,329.

(60) Provisional application No. 61/261,162, filed on Nov. 13, 2009.

(51) Int. Cl.
*B01J 20/00* (2006.01)
*B01J 20/18* (2006.01)
*C01B 39/02* (2006.01)
*C02F 1/28* (2006.01)

(52) U.S. Cl.
CPC ............. *C01B 39/026* (2013.01); *B01J 20/186* (2013.01); *C01P 2004/60* (2013.01); *C01P 2004/50* (2013.01); *C02F 1/281* (2013.01); *C02F 1/288* (2013.01); *C02F 2305/04* (2013.01); *Y10S 502/526* (2013.01)
USPC ............................ 502/408; 502/526; 210/663

(58) Field of Classification Search
USPC ........... 210/663; 502/407, 408, 414, 415, 526
See application file for complete search history.

(56) References Cited

U.S. PATENT DOCUMENTS

| | | | |
|---|---|---|---|
| 4,167,481 A | 9/1979 | Cremers et al. |
| 4,386,010 A | 5/1983 | Hildebrandt |
| 4,648,977 A | 3/1987 | Garg et al. |
| 4,786,418 A | 11/1988 | Garg et al. |
| 5,314,852 A | 5/1994 | Klatte |
| 5,376,604 A | 12/1994 | Iwasaki et al. |
| 5,667,694 A | 9/1997 | Cody et al. |
| 5,833,739 A | 11/1998 | Klatte et al. |
| 6,080,319 A | 6/2000 | Alther |
| 6,261,986 B1 | 7/2001 | Bowman et al. |
| 6,627,084 B2 | 9/2003 | Murphy et al. |
| 7,311,839 B2 | 12/2007 | Schulze-Makuck et al. |
| 7,326,347 B2 | 2/2008 | Williams et al. |
| 7,510,659 B2 | 3/2009 | Rayalu et al. |
| 2003/0050219 A1 | 3/2003 | Micco et al. |
| 2004/0018146 A1 | 1/2004 | Hosokawa et al. |
| 2004/0045902 A1 | 3/2004 | Fellers |
| 2004/0262225 A1 | 12/2004 | Cadena et al. |
| 2007/0210006 A1 | 9/2007 | Tayalu et al. |
| 2008/0280001 A1 | 11/2008 | Sohling et al. |

OTHER PUBLICATIONS

Meir W. and Olson D., 1978. Atlas of zeolite structural types, Published by the Structure Commission of the International Zeolite Association.
Cadena F. and Bowman R., 1991. Treatment of waters contaminated with BTX and Heavy metals using tailored zeolites: Technical Completion Report, WERC Project No. 90-031 in cooperation with USDOE, New Mexico Waste Management Education and Research Consortium.
Neel D. and Bowman R., 1991. Sorption of organics to surface-altered zeolites, p. 57-61, in New Mexico Water Resources Research Institute.
Cadena F. et al., 1992. Adsorption of hexavalent chromium onto tailored zeolites, p. 699-709, in Proceedings of the 47th Industrial Waste Conference, Purdue University, Lewis Publishers.
Janks J. and Cadena F., 1992. Investigations into the use of modified zeolites for removing benzene, toluene and xylene from saline produced water, p. 473-487, in Produced Water, Plenum Press.
Haggerty G. and Bowman R., 1994. Sorption of chromate and other inorganic anions by organo-zeolite, Environmental Science and Technology, vol. 28, No. 3, p. 452-458.
Bowman R. et al., 2000. Uptake of cations, anions, and non-polar organic molecules by surfactant modified clinoptilolite-rich tuff, in Natural Zeolites for the Third Millennium, p. 287-297, De Frede, Naples, Italy.
Dumas B., 2000. Seeking a Happy Medium, Pool and Spa News, Oct. 4, 2000, p. 3-5.
Peterson S., 2004. Zeo What?, World Waterpark Magazine, Feb. 2004, p. 22-24.
Peterson S. and Coufal R., 2004. The Natural Choice, Industrial Minerals Magazine, Dec. 2004, p. 52-54 and 57.
Bowman R., 2005. Relationship between total and external cation exchange capacities of zeolites from the western United States, p. 56-57, in Zeolite 06, 7th International Conference on the Occurrence, Properties and Utilization of Natural Zeolites, International Natural Zeolite Association.
International Search Report dated Jan. 18, 2011 from counterpart International Application No. PCT/US10/56682.
Notice of Allowance dated Aug. 16, 2012 from counterpart U.S. Appl. No. 12/628,817.
Canadian Office Action dated Jan. 13, 2014 from counterpart CA App. No. 2,780,895.

*Primary Examiner* — Edward Johnson
(74) *Attorney, Agent, or Firm* — James E. Walton; Richard G. Eldredge

(57) ABSTRACT

The present application relates to improved filtration of fluids. Particularly, a surfactant-treated zeolite material may be utilized for removing turbid particles from a volume of fluid, such as water.

11 Claims, 1 Drawing Sheet

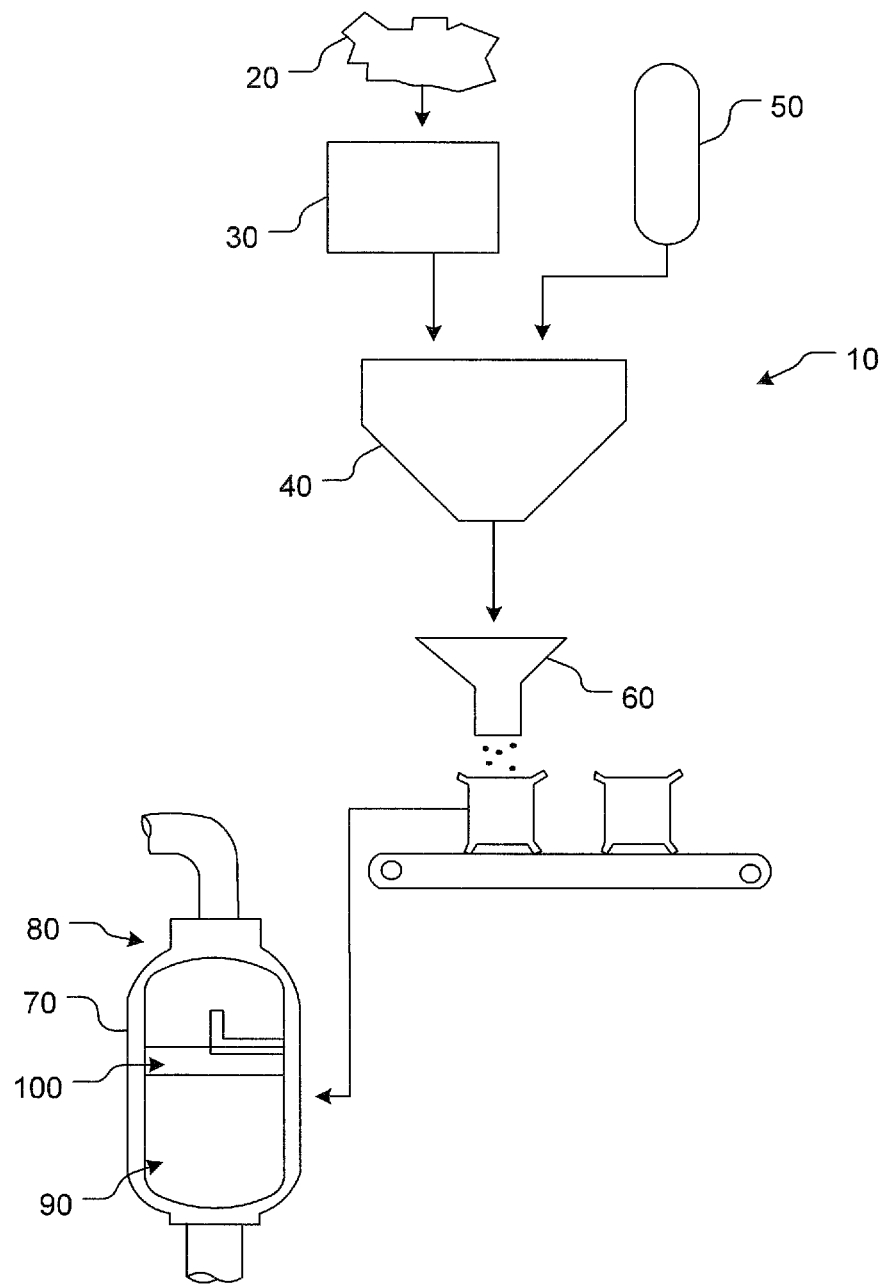

FLUID FILTRATION MEDIUM

CROSS-REFERENCE TO RELATED APPLICATIONS

This application is a Divisional of U.S. application Ser. No. 12/628,817, filed 1 Dec. 2009, filed "Fluid Filtration Medium", which claims the benefit of U.S. Provisional Application No. 61/261,162, filed 13 Nov. 2009, titled "Fluid Filtration Medium," all of which are hereby incorporated by reference for all purposes as if fully set forth herein.

BACKGROUND

1. Field of the Present Application

The present application relates to improved filtration of fluids.

2. Description of Related Art

Water filtration processes have been developed over the history of mankind to enhance clarity and to remove impurities from mediums, such as recreation and potable water. For example, water transported by aqueducts built by Roman engineers for the purposes of filling city fountains for drinking and bathing were passed through beds of sand to clarify the water.

DESCRIPTION OF THE DRAWINGS

FIG. 1 is a flowchart of an example fluid filtration process according to the present disclosure.

DETAILED DESCRIPTION

The present disclosure describes modified, natural surfactant-treated zeolite products (interchangeably referred to as "zeolite products"); processes for producing the zeolite products, including the bonding of cation surfactants to zeolite; methods for activating the zeolite products; and use of the zeolite products for enhanced turbidity removal from fluids. In some instances, one or more of the zeolite products may be in a granular form. An advantage of the zeolite products is that the zeolite products provide for improved fluid filtration. For example, in some instances, an example zeolite product may be used in the turbidity reduction of water.

The present disclosure encompasses turbidity-removing zeolites along with methods of use and production thereof. One aspect encompasses a turbidity-removing zeolite product including a granulized zeolite and a quantity of cationic surfactant to cover from 20 percent to 100 percent of External Cation Exchange ("ECEC") sites of the granulized zeolite.

Another aspect encompasses a method of forming a treated granulized zeolite product that can include applying a cationic surfactant to a granulized zeolite material such that an amount applied to the granulized zeolite material covers at least 20 percent of the ECEC sites of the granulized zeolite material.

A further aspect encompasses a method for removing turbid particles from a fluid that can include installing a quantity of surfactant-treated zeolite in a filter vessel, activating the surfactant-treated zeolite, passing a volume of fluid containing turbid particles through the activated surfactant-treated zeolite, and removing an amount of the turbid particles from the fluid with the activated, surfactant-treated zeolite.

The various aspects can include one or more of the following features. The granulized zeolite can include a zeolite having a silica-to-alumina ratio equal to or greater than 2.5. The granulized zeolite can include at least one of clinoptilolite, mordenite, phillipsite, erionite, chabazite, or faujasite. The granulized zeolite can include at least one of feldspar, mica, or polymorphs of silica. The granulized zeolite can include a cation exchange capacity equal to or greater than 0.5 milliequivalents per gram. The granulized zeolite can include a BET surface area greater than 10 $m^2/g$. The granulized zeolite can include a $d_{10}$ in the range of 0.3 mm to 0.7 mm and a $d_{60}$ in the range of 0.6 mm to 1.5 mm. The granulized zeolite can include a Uniformity Coefficient equal to or less than 2.2. The granulized zeolite can include a dry, bulk density in the range of 44 to 56 lbs./$ft.^2$. The turbidity-removing zeolite product can include a total un-bound moisture content in the range of 12 to 18 percent. The turbidity-removing zeolite product is free-flowing. The cationic surfactant can include at least one of polyamines, quaternary amines, alkylamines, or organo-silane quats.

The various aspects can also include one or more of the following features. A zeolite product may be formed from of a granulized zeolite material. A zeolite material can be crushed, and the crushed zeolite material can be sieved with series of sieves, the series of sieves including sieves having sieve sizes ranging from a minus 12 mesh (1.7 mm) to a plus 50 mesh (0.3 mm). The crushed zeolite material can have a $d_{10}$ in the range of 0.3 mm to 0.7 mm and a $d_{60}$ in the range of 0.6 mm to 1.5 mm. The granulized zeolite material can include an un-bound moisture content of six percent. Applying a cationic surfactant to a granulized zeolite material such that an amount applied to the granulized zeolite material covers at least 20 percent of the ECEC sites of the granulized zeolite material can include applying an aqueous solution of cationic surfactant to the granulized zeolite.

The various aspects can also include one or more of the following features. Activating the surfactant-treated zeolite can include saturating the surfactant-treated zeolite in water to cause surfactant contained within the surfactant-treated zeolite to bond to ECEC sites of the zeolite, backwashing the surfactant-treated zeolite, and rinsing the surfactant-treated zeolite. The surfactant-treated zeolite can include a granulized zeolite formed from at least one of a clinoptilolite, mordenite, phillipsite, erionite, chabazite, or faujasite combined with an amount of cationic surfactant to cover from 20 percent to 100 percent of ECEC sites of the granulized zeolite. The cationic surfactant can include at least one of polyamines, quaternary amines, alkylamines, or organo-silane quats. Removing an amount of the turbid particles from the fluid with the activated surfactant-treated zeolite satisfies criteria defined ANSI/NSF Standard 50-2009a, Annex B.4.

In the present disclosure, aspects of the zeolite products are discussed with respect to the filtration of water, although, as indicated above, the scope of the present disclosure is not so limited. Thus, the examples discussed below are provided merely as examples and are not meant to limit the applicability of the zeolite products to such examples in any way.

In one example implementation, a natural zeolite utilized for producing one or more of the zeolite products may have a silica-to-alumina ratio equal or greater than 2.5. Examples of some of the zeolite minerals in this group may include clinoptilolite, mordenite, phillipsite, erionite, chabazite, and faujasite. However, many other natural zeolites could be used. In some instances, the zeolite mineral ore may contain greater than 50 percent zeolite. In some instances, gangue minerals of clay, evaporates, and calcium carbonate may be avoided as such materials may be detrimental to the performance of the zeolite product.

In other instances, the zeolite used in the production of the zeolite products may include feldspar, mica, and polymorphs of silica. Such materials may take up space in the zeolite ore but may not be detrimental to the resulting zeolite product. In some implementations, the natural zeolite may have a total cation exchange capacity equal to or greater than 0.5 milliequivalents per gram and a BET surface area (i.e., a surface area determined using the Brunauer, Emmett and Teller method) of greater than 10 square meters per gram ($m^2/g$). In some implementations, zeolite ore having such properties may be crushed, screened, and, in some instances, dried to an un-bound moisture content of less than 10 percent The crushed zeolite ore may also be subjected to a screen analysis of approximately minus 12 mesh (1.7 mm) to plus 50 mesh (0.3 mm).

Un-bound moisture refers to water associated with zeolite that may be liberated by raising the temperature of zeolite to not more than 212° C. In some implementations, the crushed or granulated zeolite may have a $d_{10}$ (i.e., a tenth percentile distribution in particle size of the granular zeolite material) in the range of 0.3 mm to 0.7 mm and a $d_{60}$ (i.e., a 60th percentile distribution in particle size of the granular zeolite material) in the range of 0.6 mm to 1.5 mm. In some instances, the Uniformity Coefficient of the granular zeolite material, a ratio of $d_{10}$ to $d_{60}$, may be less than 2.2. In still other instances, the bulk density of the dry, granular zeolite material may be in the range of 44 to 56 pounds per cubic foot (lbs./$ft.^2$).

As explained above, implementations of the zeolite products of the present disclosure may include one or more of the material properties described herein while one or more other properties may vary from those values and/or ranges described. However, the scope of the present disclosure is intended to encompass zeolite products having variations of the property values and/or ranges from those described herein. Thus, the property values and/or ranges described herein are provided merely as examples and are not intended to limit the scope of the present disclosure.

In some instances, a zeolite product according to the present disclosure may provide backwash performance, for example backwash up to 20 gpm per square foot, as well as head pressure loss performance, for example head pressure loss of less than 12 psi, that is comparable to media used in most pressure filtration vessels designed and standardized for the pool and spa industry. Additionally, in some instances, a zeolite product according to the present disclosure may also provide suitable flow rates, bed cleaning, and head pressure for gravity filtration systems utilized in pool, industrial, and municipal applications. In still other instances, example zeolite products may be used in gravity-flow filtration systems favored for use in some potable water, wastewater, pre-treatment streams, irrigation, industrial, or a myriad of other applications.

The surface of zeolite granules utilized for the production of the zeolite products may be modified with a chemical of the cationic surfactant group (referred to interchangeably as "surfactant"). Example surfactants may include polyamines, quaternary amines, alkylamines, or organo-silane quats. The surfactant bonds chemically with the zeolite forming a surfactant-modified zeolite granule (interchangeably referred to as "surfactant-treated zeolite") that contains negative ionic charges within the internal crystalline surfaces of the zeolite granule and a positive ionic charge at locations where the surfactant has bonded to the external crystalline surface of the zeolite granule. Consequently, the modified zeolite provides a crystalline entity with an active electrochemical surface that is amphoteric.

It has been shown that the cationic surfactant bonds to particular locations of the zeolite crystalline structure called the External Cation Exchange sites (referred to hereinafter as "ECEC" or "ECEC sites"). The surfactants include a carbon chain that is too large to enter the three to 10 angstrom molecular pore spaces within the various zeolite crystalline structures. The result is a surface-modified zeolite (referred to interchangeably as "modified zeolite") with the positive charge moity of the cationic surfactant bonded by cation exchange to the crystalline surface. At the same time, the zeolite retains a natural negative charge at Internal Cation Exchange sites (referred to hereinafter as "ICEC" or "ICEC sites"). The negative charge is available for exchange with metal cations that fit within the zeolite's crystalline lattice.

The surfactant, for example, in the form of an aqueous solution, may be applied to the granulated zeolite to form a zeolite product. An amount of aqueous solution may be applied to the granulated zeolite so as to introduce enough surfactant to cover 20 to 100 percent of the ECEC sites of the zeolite. In some instances, the surfactant may be sprayed or pumped onto the zeolite granules in a mixer to wet the surface of the granules without saturating the granules. Application of an amount of surfactant in excess of an amount to cover 100 percent of the ECEC sites may create a double surfactant layer or possibly a micelle layer that is detrimental to turbidity reduction.

In the context of fluid filtration, a modified zeolite in which 20 percent of the ECEC sites is bonded with surfactant may perform as well or substantially as well as a modified zeolite in which 50 to 100 percent of the ECEC sites is bonded with surfactant. Further, cationic surfactants in which the molecular weight varies from 120 up to over 500 may perform similarly with respect to turbidity reduction, independent of whether the carbon chain of the surfactant is $C_8$ up to or exceeding $C_{16}$.

According to some implementations, granulated zeolite having six percent unbound moisture may be metered into a continuous-flow paddle mixer. A surfactant solution may be pumped onto the granulated zeolite to result in an eight percent added moisture. In some instances, the aqueous surfactant solution may contain three and a half percent active ingredient diluted in 96.5 percent water. In still further instances, the granulated zeolite product may exit the paddle mixer with an amount of surfactant to satisfy 50 percent of the ECEC sites. As a result, the outputted zeolite product may contain a total un-bound water of 14 percent.

Because zeolite granules are micro-porous and hydrophilic, many, if not most, natural zeolite mineral ores can hold up to, and in some cases exceed, 18 percent unbound moisture while remaining free-flowing. Consequently, granulated zeolite to which enough surfactant has been added to satisfy up to 100 percent of the ECEC sites may remain a volume of free-flowing granules that may be processed accordingly. As such, the treated zeolite granules described herein may be processed and transported in manners similar to other dry bulk materials. Further, because the surfactant-treated zeolite retains a free-flowing condition, additional processing, such as processing to dry out the zeolite material is not required, leading to processing time and cost savings.

Decreasing the un-bound moisture content in the surfactant-treated zeolite may cause the zeolite granules to become difficult to wet when introduced into a filtration vessel. For example, the surfactant on a dry zeolite granule forms a hydrophobic surface that is difficult to wet when placed into a filtration vessel. As such, according to some implementations, moisture in the surfactant-treated zeolite granules may not be removed. In some instances, surfactant-treated zeolite granules having a moisture content of between 12 and 18 percent may be easily wetted when introduced into a filtration vessel.

As explained above, the granulated zeolite is free-flowing and, thus, may be handled in ways similar to other bulk materials. As such, once the surfactant is applied (as well as at other times during the processing of the zeolite), the granulated zeolite may be handled by standard package equipment for dry, free-flow products and stored in bins, bagged, or otherwise packaged. In some instances, the surfactant-treated zeolite granules may be packaged in paper or poly film. In this manner, the surfactant-treated zeolite granules are highly stable and may enjoy a shelf life in excess of several years. Activation for complete ion-exchange of the cationic surfactant onto the zeolite granules may be completed at a later stage.

Activation may be completed when the pre-sorbed zeolite granules, i.e., surfactant-treated zeolite granules in which the surfactant has not been bonded to the zeolite particles, are placed into a vessel and saturated with water. For example, the pre-sorbed zeolite granules may be activated by introducing the zeolite granules into a filter vessel for use in a desired application and saturating the zeolite granules with water. Saturation of the zeolite granules causes the cationic surfactant to re-solubilize and come in contact with the crystalline surfaces of the zeolite in the aqueous phase. Consequently, the ion exchange between the zeolite and the surfactant occurs.

In excess of 80 percent of the chemical bonding of the surfactant to the zeolite is typically complete within 20 minutes at ambient temperature. Once activation is complete or substantially complete, the modified zeolite may be used as a filtration medium. In some instances, activation may be allowed to proceed for 24 hours before use, while, in other instances, activation may be allowed to proceed for 24 hours prior to use of the filtration medium.

In some instances, "backwash" procedures and "rinse to waste" cycles may be performed once the media has been activated or substantially activated and prior to using the activated zeolite filtration medium in filtration mode. However, in other instances, backwashing and/or "rinse to waste" cycling may not be required or desired prior to utilizing the activated zeolite filtration medium in filtration mode. The backwashing and "rinse to waste" cycles may be utilized to wash out any excess, unbonded surfactant as well as detritus that would interfere with the filtration process. In some implementations, a backwash may include at least three bed volumes of flush water, while a "rinse to waste" cycle may include at least one bed volume of water.

FIG. 1 shows a flowchart of an example production process 10 for a surfactant-treated zeolite. At 20, a zeolite material, such as one or more of the zeolite materials described above, may be extracted from the earth. At 30, the extracted zeolite material may be subjected to one or more operations or processes granulize the zeolite material. For example, the zeolite material may be subjected to crushing and/or screening. As explained above, in some instances, the zeolite may be crushed and subjected to a minus 12 mesh (1.7 mm) to plus 50 mesh (0.3 mm) screening analysis. In other implementations, a screening analysis may encompass a broader or narrower range. For example, an application of the granular zeolite may define one or more of the crushing or screening operations to which the zeolite material is subjected. Further, in some implementations, a granular zeolite having a $d_{10}$ within the range of 0.3 mm to 0.7 mm and a $d_{60}$ within the range of 0.6 mm to 1.5 mm.

In some instances, the zeolite material may be subjected to one or more drying operations. For example, a desired un-bound moisture content of six to ten percent water may be desired. The initial moisture content of the zeolite material may determine whether or not one or more drying operations are required.

At 40, the granular zeolite material may be introduced into a mixing apparatus along with an amount of surfactant, such as one or more of the surfactants described above. Dispensation of one or more of the granular zeolite or surfactant may be metered. For example, one or more of the granular zeolite or surfactant may be metered such that a surfactant-treated granular zeolite material in which 20 to 100 percent of the zeolite's ECEC sites are bonded with the surfactant results. At 50, the surfactant may be formed into an aqueous solution of a desired concentration. For example, in some instances, the aqueous solution may be 3.5 percent surfactant and 96.5 percent water. However, such solution is merely an example. Thus, other surfactant solution concentrations may be used.

In some instances, the surfactant and the granular zeolite may be combined such that the un-bound moisture content does not exceed 18 percent. In other instances, the un-bound moisture content may be lower or higher than 18 percent. In some instances, a fluid, in addition to the surfactant solution, may be introduced into the mix to control the un-bound moisture content, while, in other implementations, additional fluids may not be used. Further, controlling the un-bound moisture content so as not to exceed 18 percent allows the treated zeolite granules to remain free-flowing, facilitating the ease of subsequent processing of the material.

The surfactant-treated zeolite material may be transferred to a packaging process at 60. The treated zeolite material may be packaged in any desired manner. For example, in some instances, the treated zeolite may be packaged into paper or poly film containers. The containers may be of any desired size. In other instances, packaging may be avoided and the material may be distributed, for example, in bulk via rail cars, trucks, etc.

At 70, the surfactant-treated zeolite material may be utilized for filtration of fluids. For example, the treated zeolite material may be used in the filtration of water sources. Particularly, the treated zeolite may be used to remove turbid particles from a water source. In some instances, feature 70 may represent a filtration vessel 80 having a bed of the surfactant-treated zeolite 90 with a water layer 100 above the zeolite bed 90.

Further, in some instances, the treated zeolite material may be activated at 70. For example, during activation, the surfactant-treated zeolite may be soaked in an excess of water (e.g., saturated) in the filtration vessel 80 for a desired period of time. In some implementations, the treated zeolite material may be soaked for 20 minutes at ambient temperature to complete activation. In other examples, activation may be permitted to occur for longer or shorter periods. For example, the treated zeolite may be allowed to soak in excess water for 24 hours or more prior to use. In other examples, the treated zeolite material may be soaked for between 20 minutes and 24 hours prior to use.

The activated surfactant-treated zeolite may be backwashed prior to use. Backwashing may be performed, for example, to remove excess surfactant and/or detritus. One or more cycles of "rinse to waste" may also be performed prior to use of the surfactant-treated zeolite in filtering a fluid source.

While the above description provides examples with regard to the processing and/or production of the surfactant-treated zeolite, such are only examples and are not meant to limit or otherwise define the scope of the present disclosure. Consequently, production and/or use of the surfactant-treated zeolite may vary from those provided herein while remaining within the scope of the present disclosure.

Several examples involving the use of the modified granular zeolite material are described below.

Example No. 1

In Example No. 1, several filtration media were tested in a 12 inch-long polycarbonate column having a 2.5-inch inner diameter ("ID") (hereinafter referred to as "column"). The column was prepared with O-ring-fitted stoppers on both ends. A pump having a ball valve control was plumbed to pull water at various flow rates from a 20 liter reservoir with down-flow, through the column, and back to the reservoir. The filtration media were pre-washed or prepared and placed in the column such that the filtration medium formed a bed height of six inches. A 50 mesh stainless steel screen was disposed at a lower end of the filtration medium. A perforated plastic disc was placed on an upper end of the filtration medium, and a three-inch head of water was maintained above the upper end of the filtration medium to prevent scouring from the high-volume water flow entering the column.

Flow rate of the water was determined by measuring the rate at which the water was discharged from the column. Flow rate was adjusted with an in-line ball valve. Each filtration medium was backwashed after being placed into the column with about a 30 percent bed lift until clear water resulted. The bed was further cleaned by a brief down-flow rinse. For each filtration medium, the column was then capped and fitted with an inlet and outlet hose. Water flow rate was regulated between 15 and 20 gpm per foot squared of media surface area ($gpm/ft^2$).

The 20 liter reservoir was filled with tap water and adjusted to about 50 NTU (Nephelometric Turbidity Unit) with U.S. Silica ground silica (Sil-co-sil #106), produced by U.S. Silica Company of Berkeley Springs, West Va., to make up the challenge water. A LaMotte Model 2020 turbidimeter, produced by LaMotte Company of 802 Washington Avenue, Chestertown, Md., was used for all of the turbidity testing. Circulating water in the clean bed was measured at less than 2 NTU in all trials before the challenge water was introduced to the columns. Operational procedures and calculations follow NSF/ANSI Standard 50-2009a, part B5.

TABLE 1

Experimental Results of Example 1.

| Media | Treatment | ECEC Coverage Percent | Starting NTU | End NTU after Five (5) Turnovers | Percent Turbidity Reduction |
|---|---|---|---|---|---|
| Silica Sand | None | — | 60 | 25 | 58 |
| Zeolite #1 | None | — | 50 | 13 | 74 |
| Zeolite #2 | None | — | 54 | 24 | 55 |
| Zeolite #3 | None | — | 53 | 30 | 43 |
| Treated #1 | HDTMA | 100 | 49 | 1.1 | 98 |
| Treated #2 | HDTMA | 50 | 52 | 2.1 | 96 |
| Treated #3 | DADMA | 100 | 60 | 8.0 | 86 |
| Treated #4 | DADMA | 100 | 50 | 4.0 | 92 |

With respect to Table 1, above, Silica Sand is filter sand obtained from Leslie's Swimming Pool Supply of 2740 Wyoming Blvd NE, Albuquerque, N.Mex. 87111. Zeolite #1 is Clinoptilolite produced by St. Cloud Mining Co., of Winston Millsite Winston, N.Mex. 87943. Zeolite #2 is Clinoptilolite produced by Zeotech Corporation of 115 West 7th Street, Suite 1400, Fort Worth, Tex. 76102. Zeolite #3 is Clinoptilolite produced by Bear River Zeolite Co., of 4323 East Glendale Road, Preston, Id. 83263. Treated #1 is a surfactant-treated zeolite formed from Hexadecyltrimethyl ammonium chloride (interchangeably referred to as "HDTMA") on Zeolite #1 soaked for 3 hours. Treated #2 is a surfactant-treated zeolite formed from Hexadecyltrimethyl ammonium chloride on Zeolite #1 soaked for 30 minutes. Treated #3 is a surfactant-treated zeolite formed from Dimethyldialyl ammonium chloride (interchangeably referred to as "DADMA") on Zeolite #1 soaked for 40 minutes. Treated #4 is a surfactant-treated zeolite formed from Dimethyldialyl ammonium chloride on Zeolite #1 soaked for 8 minutes.

The turbidity reduction for Silica Sand and three untreated, commercially available zeolites (Zeolites #1, #2, and #3, respectively) commonly used in water filtration systems varied from 43 to 74 percent removal after five turnovers. It is noted that a turnover is the time in which the water volume in the reservoir, flowing at a given flow rate, would have completely passed through the filtration medium bed. Thus, five turnovers is the amount of time, at a given flow rate, the amount of water in the reservoir would have passed through the filtration medium bed five times. Testing in columns and in commercial applications over the last several years suggest that the removal rates determined and listed in Table 1 are typical removal rates for these products, i.e., the Silica Sand and Zeolites #1, #2, and #3.

On the other hand, the results of turbidity reduction for all of the surfactant-treated zeolites show a marked improvement. HDTMA-treated zeolites or DADMA-treated zeolites had a turbidity reduction of 86 to 98 percent after five turnovers. Results also indicate that a DADMA-treated zeolite in which the DADMA was allowed to soak into the zeolite granules for eight minutes performed as well as a DADMA-treated zeolite in which the DADMA was allowed to soak into the zeolite granules for 40 minutes. Similarly, results indicated that HDTMA-treated zeolite in which the HDTMA was allowed to soak into the zeolite granules for 30 minutes performed as well as a HDTMA-treated zeolite in which the HDTMA was allowed to soak into the zeolite granules for three hours.

Example No. 2

In Example No. 2, a series of four consecutive filtration runs and backwashes were made with a surfactant-treated zeolite medium to determine attenuation of turbidity removal over time and use. Zeolite #1 was sorbed at a level of 25 percent of the ECEC with an organo-silane compound. Dry zeolite granules were sprayed with a 2.5 percent solution of the organo-silane compound (interchangeably referred to as "silane solution"). Particularly, the organo-silane compound used was Zycrobial produced by Zydex Industries of 25-A Gandhi Oil Mill Compound, Gorwa, Vadodara-390016, Gujarat, India. Six hundred cubic centimeters of filter media were sprayed with 60 milliliters of the silane solution. The treated zeolite that resulted was free-flowing.

A twelve-inch column similar to the one described in Example No. 1, above, was loaded with the surfactant-treated Zeolite #1 and soaked with enough tap water to cover the media for 30 minutes. The column was then backwashed and rinsed. Challenge water containing 60 NTU of Sil-co-sil 106 was flowed through the column at a rate of 20 gpm per foot squared of media surface area.

Turbidity measurements were taken at the end of each turnover on a 20 liter reservoir for five turnovers and results were recorded. At the end of the five turnovers, the column was backwashed and rinsed prior to performing a subsequent filtration test with new challenge water. This procedure was repeated twice using Sil-co-sil 106 as the water contaminant and twice using ISO 12103-1 A3 Medium Test Dust as the water contaminate. The results are shown below in Table 2.

TABLE 2

Experimental Results of Example 2.

| Run No. | Contaminant | Initial NTU | NTU at First Turnover | NTU at Fifth Turnover | Percent Removal after Fifth Turnover |
|---|---|---|---|---|---|
| 1 | Sil-co-sil 106 | 60 | 5.0 | 1.0 | 98 |
| 2 | Sil-co-sil 106 | 55 | 4.5 | 0.3 | 99 |
| 3 | A3 Medium Test Dust | 60 | 5.3 | 1.0 | 98 |
| 4 | A3 Medium Test Dust | 95 | 22 | 2.6 | 97 |

The results demonstrate continued efficacy for turbidity reduction of the surfactant-treated zeolite through four column runs of five turnovers, each run being followed by rigorous backwash. The results of Run No. 1 show that the surfactant-treated zeolite removed 98.3 percent of turbidity from a 60 NTU challenge water after five turnovers, while the results of Run No. 4 show that the surfactant-treated zeolite removed 97.3 percent of the turbidity from a 95 NTU challenge water on the fifth turnover. Based on the test results, it is believed that the organo-silane is bonded to the zeolite and remains effective after considerable "break-in" use.

Example No. 3

Example No. 3 addresses whether salinity content of a challenge water affects the turbidity reduction properties of a surfactant-modified zeolite. Many modern swimming pools as well as some industrial applications require filtration of saline or brackish water. Saline swimming pools generally regulate salt content at 1,500 to 3,000 ppm sodium chloride ("NaCl"). A concern is that a high sodium ion concentration in contact with the surfactant-modified zeolite may degrade the zeolite by exchange of and/or displacement of the cationic surfactant bonded to the zeolite crystalline surface at the ECEC sites by the sodium ions.

In Example No. 3, a column was set up in a manner similar to that described above in Example No. 1 with Zeolite #1 sorbed with DADMA so as to cover 20 percent of the ECEC sites. A recirculating body of water was prepared containing 3,000 ppm of NaCl. Clear recirculating water had a turbidity level of 0.4 NTU. Sil-co-sil 106 was utilized to form a challenge water having turbidity level of 45 NTU. Results of Example No. 3 are shown in Table 3.

TABLE 3

Experimental Results of Example No. 3.

| Turnover | NTU | Turbidity Removal Percentage |
|---|---|---|
| 1 | 21 | 53 |
| 2 | 5.5 | 88 |
| 3 | 2.8 | 94 |
| 4 | 1.8 | 96 |
| 5 | Water Spilled | — |

The results demonstrate that the surfactant-modified zeolite produces a superior turbidity reduction despite a high salinity content of the challenge water. The anomalous reading in turnover No. 1 may have been from a "bumping" of the column resulting in an upset. Data from turnover 5 was lost due to a spillage. Nevertheless, the data associated with turnovers 2 through 4 are consistent with having the surfactant fully functional and remaining on the zeolite media in spite of the high sodium content of the challenge water.

Example No. 4

Example No. 4 tested the cleanability of a surfactant-modified zeolite filter medium using a test procedure defined in ANSI/NSF Standard 50-2009a, Annex B.4. A 24-inch diameter, high-rate sand filter vessel was used. One hundred fifty pounds of Zeolite #2 was sorbed with enough DADMA to cover 50% of the ECEC sites. The surfactant-modified zeolite and loaded into the filter vessel. After backwash and rinse, clean water was run through the filter, and an initial static head loss of 9.2 psi at a flow of 20 gpm/ft$^2$ was measured across the filter vessel.

A mixture of 1.89 lbs. of ball clay, 0.03 lbs. of baby oil, and 1.89 lbs. of diatomaceous earth was mixed into a slurry. The slurry was added to the re-circulating water until the pressure across the filter vessel increased to 24.05 psi. The filtration mode was stopped and backwash mode was initiated.

Backwash continued for five minutes at 63 gpm (20 gpm/ft$^2$) followed by a filter rinse of one minute. The vessel was then turned back on to filtration mode. The head loss measured across the filter vessel was 9.1 psi. The results show slightly less head loss pressure than the starting value of 9.2 psi. Consequently, the results of this example demonstrate excellent cleanability of the surfactant-modified zeolite filtration medium.

Example No. 5

In Example No. 5, a turbidity reduction test was run on two surfactant-modified zeolite media in accordance with the procedure outlined in ANSI/NSF Standard 50-2009a, Annex B. Tests were performed on 150 lbs. of media placed into a 24-inch diameter, Sta-Rite pressure filter. A 1,000 gallon test tank was used with a cross-sectional flow-rate of 20 gpm/ft$^2$ of media. The challenge water was prepared by adding ground silica (Sil-co-sil 106) until the challenge water reached a turbidity of 45±10 NTU. A sample of the challenge water was measured for turbidity (NTU) at the end of each reservoir turnover. Turnover of the reservoir at a total flow rate of 63 gpm was 9 minutes, 39 seconds.

Two different filtration media were tested, a surfactant-modified Zeolite #2 and a surfactant-modified Zeolite #1. Results are presented below in Tables 4 and 5, respectively. For the surfactant-modified Zeolite #2, the water used to form the challenge water had a turbidity level of 0.88 NTU, while the challenge water had a turbidity level of 49.3 NTU. For the surfactant-modified Zeolite #1, the water used to form the challenge water had a turbidity of 0.53, while the challenge water had a turbidity level of 40.8 NTU.

TABLE 4

Experimental Results for Surfactant-Modified Zeolite #2 with 50% ECEC DADMA.

| Turnover | Effluent Turbidity | Percent Removal |
|---|---|---|
| 1 | 12.00 | 75.7 |
| 2 | 7.02 | 85.8 |
| 3 | 4.46 | 90.9 |

TABLE 4-continued

Experimental Results for Surfactant-Modified Zeolite #2 with 50% ECEC DADMA.

| Turnover | Effluent Turbidity | Percent Removal |
|---|---|---|
| 4 | 2.51 | 94.9 |
| 5 | 1.39 | 97.2 |

Notes:
Initial Turbidity - 0.88 NTU;
Challenge Water Turbidity - 49.3 NTU

TABLE 5

Experimental Results for Surfactant-Modified Zeolite #1 with 50% ECEC DADMA.

| Turnover | Effluent Turbidity | Percent Removal |
|---|---|---|
| 1 | 4.36 | 89.3 |
| 2 | 0.59 | 98.5 |
| 3 | 0.44 | 98.9 |
| 4 | 0.34 | 99.2 |
| 5 | 0.43 | 98.9 |

Notes:
Initial Turbidity - 0.53 NTU;
Challenge Water Turbidity - 40.8 NTU

For the test defined by ANSI/NSF Standard 50-2009a, Annex B, the NSF requires at least a 70 percent turbidity reduction by the fifth turnover in order to pass the test. Both filtration media surpassed a 70 percent turbidity reduction by the first turnover. Accordingly, the surfactant-modified zeolites demonstrate a superior ability for reducing turbidity.

Example No. 6

Both significant reduction in turbidity particles ("TSS") as well as a determination of the "fineness" of filtration are important aspects in fluid filtration, particularly in the filtration of potable water supplies. The "fineness" of filtration is sometimes referred to as "micron reduction" or "nominal particle reduction". These terms relate to the smallest particle size effectively removed by a given filter medium.

To obtain an approximation of relative particle removal from filtered water, several columns were prepared with sand and various zeolite media. The media were placed in 2.5-inch ID polycarbonate columns. The bed depth for the filtration media was eight inches. The media were backwashed, rinsed, and flooded with tap water containing 30 NTU of ISO 12103-1 A3 Medium Test Dust at a flow rate of 15 gpm/ft$^2$. The influent, i.e., the challenge water containing the test dust prior to being passed through the filtration media, included particles from 0.7 to 70 microns. The 85th percentile of particles measured 22 microns. A particle count of the control water reservoir was taken from samples of the challenge water at the beginning and end of the trial, as shown in Table 6.

The challenge water was pumped into the columns containing the media with approximately three inches of water above the upper end of the media bed. For the filtration media used for testing, an eight-inch bed depth within the columns contains approximately 350 ml of open pore space, also referred to as pore volume. Five liters of challenge water (14 pore volumes) were passed through each column at a rate of 15 gpm/ft$^2$. Immediately after the passing five liters of challenge water through the columns, a 250 ml aliquot sample of effluent, i.e., challenge water after having passed through the filtration media, was taken and analyzed for particles. The particle content data are reported in Table 6, below.

Table 6 contains particle size data for various samples, showing the reduction in particle sizes of particles contained in the challenge water before and after passage through the filtration media. Particularly, Table 6 includes sample data for the 50th percentile and 85th percentile particle sizes. The percentile values were obtained from a particle size distribution curve plotted on semi-log paper for each of the samples. The analyses were run on a Microtrac X100, produced by Microtrac, Inc., of 44 Hokes Mill Road, York, Pa. 17404, with a run time of 30 seconds, done in triplicate.

TABLE 6

Particle Size Reduction in Microns.

| Sample No. | Media | Influent Turbidity NTU | Particle Size @ 50% | Particle Size @ 85% | Size Range Of Particles | Effluent Turbidity NTU |
|---|---|---|---|---|---|---|
| Control | A3 Med Test Dust | 30 | 9.0 | 22 | 0.7-70 | NA |
| 9909-1 | Silica Sand, #20 | 30 | 8.0 | 15 | 0.7-20 | 30 |
| 9909-2 | Zeolite #3 | 30 | 6.0 | 12 | 0.7-30 | 25 |
| 9909-3 | Zeolite #1 | 30 | 8.0 | 12 | 0.7-30 | 27 |
| 9909-4 | Zeolite #2 | 30 | 7.0 | 15 | 0.7-30 | — |
| 9909-11 | Zeolite #1 with DADMA | 30 | 2.5 | 3.5 | 0.7-5.0 | 2.5 |
| 9909-6 | Zeolite #2 with DADMA | 30 | 2.5 | 3.0 | 0.7-5.0 | 10 |
| Control | A3 Med Test Dust | 30 | 8.0 | 18 | 0.7-70 | NA |

The tests represent severe conditions in that the filtration media are limited to an eight-inch bed depth, the challenge water flow rate was 15 gpm/ft$^2$, and the samples were collected after only 5 liters, or 14 pore volumes, of challenge water had been passed through the columns. These results may not reflect data that would be collected through strict ANSI/NSF 42 protocol. However, the test results for each filtration medium can be compared relative to each other.

Challenge water with A3 Medium Test Dust has an 85th percentile particle size of 22 microns. The results for silica sand, Zeolite #1, Zeolite #2, and Zeolite #3 were similar to each other with the 50th percentile from 6 to 8 microns and 85th percentile from 12 to 15 microns. Surfactant-treated Zeolite #1 with DADMA and Zeolite #2 with DADMA removed turbidity effectively, as demonstrated in prior examples. The ECEC coverage of the treated zeolites was approximately 50 percent. However the particle analysis of the remaining turbid particles shows particle size reduction to the range of 2.5 to 3.5 microns. This is excellent for a granular media and far superior to the untreated samples of Zeolite #1 and Zeolite #2.

Example No. 7

Example No. 7 addressed the effect of chlorine concentrations on the surfactant-modified zeolites. Water in pools, spas, and water attractions routinely require "chlorine shock" or similar severe disinfectant treatment in order to reduce the level of pathogens. The oxidation potential of a typical chlorine shock of 20 to 30 milligrams per liter of "free-chlorine" is a concern for the longevity of a cation surface-modified zeolite medium.

A test was performed to determine any degradation of the surfactant-modified zeolite filtration media caused by a 35 milligram per liter chlorine shock. A sample of Zeolite #1 was prepared with DADMA at 80 percent ECEC loading. A filtration column was prepared in a manner similar to that described above in Example No. 1. Results are provided in Table 7.

TABLE 7

Experimental Results of Example No. 7.

| Run No. | Chlorine Level in PPM | Initial NTU | NTU after First Turnover | NTU after Fifth Turnover | Percentage Removal after Fifth Turnover |
|---|---|---|---|---|---|
| 1 | 2 | 81 | 5.5 | 3.8 | 95.3 |
| 2 | 35 | 67.3 | 38.2 | 23.6 | 64.9 |
| 3 | 2 | 86 | 3.0 | 0.8 | 99.1 |
| 4 | 2 | 80 | 7.8 | 3.1 | 96.1 |
| 5 | 2 | 85 | 9.7 | 3.9 | 95.4 |

The results of Table 7 show removal of ISO 12103-1 A3 Medium Test Dust of greater than 90 percent at five turnovers. The water flow for all five runs was 12 gpm/ft.$^2$. Run No. 1 was performed to establish baseline performance. In Run No. 2, 35 milligrams per liter of free chlorine in the form of sodium hypochlorite was added to the reservoir. The high chlorine level considerably reduced the turbidity reduction. Particularly, the turbidity reduction obtained from the surfactant-modified zeolite decreased from the 90 percent and greater turbidity reduction observed in previous tests to about a 65 percent reduction. Three subsequent runs were made with the same media after backwash and rinse. Run No. 3, immediately following the high chlorine shock, gave the best results for turbidity removal—a 99.1 percent turbidity reduction. Consequently, it is believed that the bonded surfactant, the DADMA in this particular example, was not removed, degraded, or oxidized by the high-chlorine level. Rather, the performance of the surfactant-modified zeolite was improved. Run Nos. 4 and 5 continue to show the DADMA sorbed onto the zeolite being effective in subsequent filtration runs after backwash.

Although the present disclosure has been described with several implementations, various changes and modifications may be suggested to one skilled in the art. It is intended that the present disclosure encompass such changes and modifications as fall within the scope of the appended claims and their equivalence.

What is claimed is:

1. A method of forming a treated granulized zeolite product, comprising:
    applying a cationic surfactant to a granulized zeolite material, such that an amount applied to the granulized zeolite material covers at least 20 percent of the ECEC sites of the granulized zeolite material.

2. The method of claim 1, further comprising:
    granulizing a zeolite material to produce the granulized zeolite material.

3. The method of claim 2, wherein the granulizing of the zeolite material comprises:
    crushing the zeolite material; and
    sieving the crushed zeolite material with series of sieves, the series of sieves comprising:
        sieves having sieve sizes ranging from about a minus 12 mesh (1.7 mm) to about a plus 50 mesh (0.3 mm).

4. The method of claim 1, wherein the crushed zeolite material comprises:
    a $d_{10}$ in the range of about 0.3 mm to about 0.7 mm and a $d_{60}$ in the range of about 0.6 mm to about 1.5 mm.

5. The method of claim 1, wherein the granulized zeolite material comprises:
    an un-bound moisture content of about six percent.

6. The method of claim 1, wherein the applying of the cationic surfactant to a granulized zeolite material comprises:
    applying an aqueous solution of cationic surfactant to the granulized zeolite.

7. A method for removing turbid particles from a fluid, comprising:
    installing a quantity of surfactant-treated zeolite in a filter vessel;
    activating the surfactant-treated zeolite;
    passing a volume of fluid containing turbid particles through the activated surfactant-treated zeolite; and
    removing an amount of the turbid particles from the fluid with the activated surfactant-treated zeolite.

8. The method of claim 7, wherein activating the surfactant-treated zeolite comprises:
    saturating the surfactant-treated zeolite in water to cause surfactant contained within the surfactant-treated zeolite to bond to ECEC sites of the zeolite;
    backwashing the surfactant-treated zeolite; and
    rinsing the surfactant-treated zeolite.

9. The method of claim 7, wherein the surfactant-treated zeolite comprises:
    a granulized zeolite formed from at least one of a clinoptilolite, mordenite, phillipsite, erionite, chabazite, or faujasite combined with an amount of cationic surfactant to cover from about 20 percent to 100 percent of the ECEC sites of the granulized zeolite.

10. The method of claim 9, wherein the cationic surfactant comprises:
    at least one of polyamines, quaternary amines, alkylamines, or organo-silane quats.

11. The method of claim 7, wherein the removing of the amount of the turbid particles from the fluid with the activated surfactant-treated zeolite satisfies criteria defined by ANSI/NSF Standard 50-2009a, Annex B.4.

* * * * *